United States Patent
Glatthaar et al.

(10) Patent No.: US 8,007,934 B2
(45) Date of Patent: Aug. 30, 2011

(54) ACTIVATABLE BATTERY FOR AN ELECTRONIC ARTILLERY FUSE

(75) Inventors: Karl Glatthaar, Oberndorf (DE); Herbert Höni, Aichhalden-Rötenberg (DE); Alexander Zinell, Villingen-Schwenningen (DE)

(73) Assignee: Junghans Microtec GmbH, Dunningen-Seedorf (DE)

( * ) Notice: Subject to any disclaimer, the term of this patent is extended or adjusted under 35 U.S.C. 154(b) by 1013 days.

(21) Appl. No.: 11/858,152

(22) Filed: Sep. 20, 2007

(65) Prior Publication Data
US 2008/0081248 A1    Apr. 3, 2008

(30) Foreign Application Priority Data
Sep. 28, 2006   (DE) .......................... 10 2006 045 953

(51) Int. Cl.
*H01M 6/38* (2006.01)

(52) U.S. Cl. ....................................... 429/116; 429/114

(58) Field of Classification Search .................. 429/114, 429/116
See application file for complete search history.

(56) References Cited

U.S. PATENT DOCUMENTS

| | | |
|---|---|---|
| 3,754,996 A | 8/1973 | Snyder |
| 4,684,586 A | 8/1987 | Haskins et al. |
| 6,673,486 B2 | 1/2004 | Rüdenauer et al. |

FOREIGN PATENT DOCUMENTS

| | | |
|---|---|---|
| DE | 3718788 A1 | 12/1987 |
| DE | 10038066 B4 | 3/2002 |
| EP | 1 178 550 A1 | 2/2002 |
| EP | 1 467 423 A2 | 10/2004 |
| GB | 2192482 A | 1/1988 |
| JP | 10-302811 A | 11/1998 |

*Primary Examiner* — Ula C Ruddock
*Assistant Examiner* — Thomas H Parsons
(74) *Attorney, Agent, or Firm* — Laurence A. Greenberg; Werner H. Stemer; Ralph E. Locher

(57) ABSTRACT

An activatable battery for an electronic artillery fuse and mortar fuse includes an ampoule filled with an electrolyte, and an activation device for rupturing the ampoule. In order to evaluate the duration of a mechanical impulse acting on the battery, the activation device can be freed by a timing member having an inertia body which is axially and rotatably displaceable and against which a compression spring is operative. A compact structure and reliable installation of the ampoule in the battery is achieved in that the battery has an upper battery portion and a lower battery portion, the activation device is provided in the upper battery portion and the ampoule is disposed immovably in the lower battery portion.

16 Claims, 1 Drawing Sheet

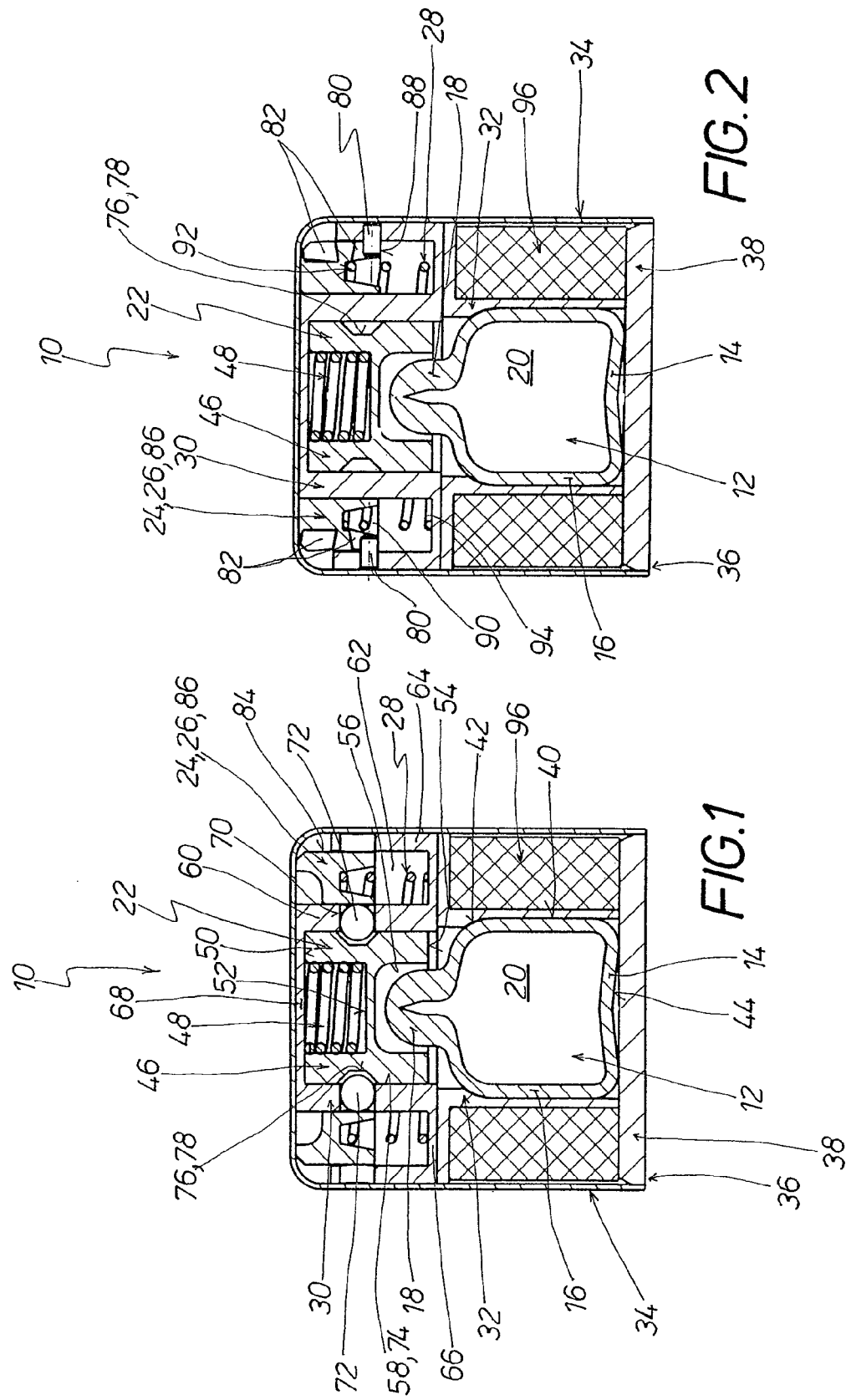

ACTIVATABLE BATTERY FOR AN ELECTRONIC ARTILLERY FUSE

CROSS-REFERENCE TO RELATED APPLICATION

This application claims the priority, under 35 U.S.C. §119, of German Patent Application DE 10 2006 045 953.9, filed Sep. 28, 2006; the prior application is herewith incorporated by reference in its entirety.

BACKGROUND OF THE INVENTION

Field of the Invention

The invention relates to an activatable battery for an electronic artillery fuse and mortar fuse. The battery includes an ampoule filled with an electrolyte and an activation device for rupturing the ampoule. In order to evaluate the duration of a mechanical impulse acting on the battery, the activation device can be freed by a timing member having an inertia body which is axially and rotatably displaceable and against which a compression spring is operative.

Such an activatable battery for an electronic artillery fuse is known from German Patent DE 100 38 066 B4, corresponding to U.S. Patent Application Publication No. US 2002/0034681 and U.S. Pat. No. 6,673,486, assigned to the assignee of the instant application. That known battery, in a cup-shaped housing which is closed by a cover element, has an ampoule filled with an electrolyte, an ampoule holding body, and a central inertia body which is connected to the ampoule holding body by way of ball-and-groove guides. Those three components of that known battery are disposed axially displaceably in the cup-shaped housing, so that protection for the ampoule against unwanted or unintended mechanical loadings still leave something to be desired.

SUMMARY OF THE INVENTION

It is accordingly an object of the invention to provide an activatable battery for an electronic artillery fuse, which overcomes the hereinafore-mentioned disadvantages of the heretofore-known devices of this general type and which is protected from unwanted mechanical loadings in an improved and structurally simple fashion.

With the foregoing and other objects in view there is provided, in accordance with the invention, an activatable battery for an electronic artillery fuse and mortar fuse. The activatable battery comprises an upper battery portion and a lower battery portion. An ampoule is to be filled with an electrolyte and is disposed immovably in the lower battery portion. An activation device is disposed in the upper battery portion for rupturing the ampoule. A timing member, for freeing the activation device for evaluation of a duration of a mechanical impulse acting on the battery, has an axially and rotatably displaceable inertia body. A compression spring is operative against displacement of the inertia body.

The fact that the ampoule is disposed immovably in the lower battery portion, in the battery according to the invention, affords the advantage that unintentional or unwanted loadings, that is to say interference impulses, do not reach the ampoule. Advantageously, the battery according to the invention for an electronic artillery fuse and mortar fuse is suitable for satisfying the enormously high safety and reliability demands of new modern weapon systems or the components of different weapon systems. A further advantage is that the battery according to the invention can be implemented with relatively small dimensions, that is to say it can have a compact structure with a small diameter.

Besides the comparatively compact configuration of the activatable battery according to the invention, further advantages are that no axial movement of the ampoule is necessary in order to rupture it at the correct time, that installation of the ampoule in the battery according to the invention is possible reliably, safely and without taking up a great deal of time, that there is no need for adhesive connections as are required in other known activatable batteries, and that reliable opening of the ampoule is possible independently of charging.

Other features which are considered as characteristic for the invention are set forth in the appended claims.

Although the invention is illustrated and described herein as embodied in an activatable battery for an electronic artillery fuse, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. Further details, advantages and features will be apparent from the description hereinafter of an embodiment, illustrated in the drawing, by way of example, of the activatable battery according to the invention for an electronic artillery fuse and mortar fuse.

BRIEF DESCRIPTION OF THE SEVERAL VIEWS OF THE DRAWING

FIG. 1 is a diagrammatic, sectional view of an activatable battery, which is taken along a first sectional plane; and FIG. 2 is a sectional view of the activatable battery of FIG. 1, which is taken along a sectional plane crossing the sectional plane of FIG. 1.

DETAILED DESCRIPTION OF THE INVENTION

Referring now in detail to FIGS. 1 and 2 of the drawings, there is seen a configuration of an activatable battery 10 for an electronic artillery fuse and mortar fuse. The battery 10 includes an ampoule 12 which has a bottom 14, a side wall 16 extending away from the bottom 14 and a projection 18. The ampoule 12 is filled with an electrolyte 20.

In order to rupture the ampoule 12, the battery 10 has an activation device 22 which can be released by a timing member 24 for evaluation of the duration of a force shock acting on the battery 10, that is to say a mechanical impulse. The timing member 24 has an inertia body 26 which is axially and rotatably displaceable and against which a compression spring 28 is operative.

The activatable battery 10 has an upper battery portion 30 and a lower battery portion 32, which are disposed in such a way as to bear against each other in a cup-shaped housing 34. A cup opening 36 of the cup-shaped housing 34 is closed sealingly by a cover element 38.

The ampoule 12 filled with the electrolyte 20 is disposed immovably in the lower battery portion 32. For that purpose, the bottom 14 of the ampoule 12 bears against the cover element 38 of the cup-shaped housing 34 and its side wall 16 is fixed to an electrolyte-permeable ampoule receiving portion 40 of the lower battery portion 32. The ampoule receiving portion 40 has internal dimensions which are matched without play to external dimensions of the side wall 16 of the ampoule 12. The ampoule receiving portion 40 is also provided with a retaining shoulder 42 in order to axially immovably fix the ampoule 12 between the retaining shoulder 42 and the cover element 38.

The bottom 14 of the ampoule 12 is provided with an indentation 44 in order to reliably rupture the ampoule 12 at a given time.

The projection 18 of the ampoule 12, which is remote from the bottom 14, projects into the upper battery portion 30. An ampoule striker 46 and a striker spring 48 of the activation device 22, are provided in the upper battery portion 30. The ampoule striker 46 has a first end 50, remote from the cover element 38, with a central blind hole 52 in which the striker spring 48 is disposed. The striker spring 48 is formed by a mechanically prestressed compression coil spring.

The ampoule striker 46 has a second end 54, towards the cover element 38, with a central recess 56 into which the projection 18 of the ampoule 12 projects with a slight spacing at all sides in an inactive storage condition.

The upper battery portion 30 has a central space 58 for the ampoule striker 46 and for the striker spring 48, as well as an annular space 62, which is spaced from the central space 58 by a sleeve wall 60 and which is delimited externally by an annular flange 64. The annular flange 64 is formed in one piece, with regard to the material involved, with the sleeve wall 60, by way of an annular connecting portion 66.

The central space 58 of the upper battery portion 30 is closed at the top side by a cover 68, which is formed in one piece with regard to the material involved.

The sleeve wall 60 of the upper battery portion 30 has a number of through holes 70 which are uniformly distributed in the peripheral direction of the sleeve wall 60. A locking ball 72 is disposed in each respective through hole 70.

The ampoule striker 46 has a recess 76 at its outer peripheral surface 74 adjacent the sleeve wall 60. The recess 76 is in the form of a groove 78, which extends around the outer peripheral surface 74 of the ampoule striker 46.

As can be seen from FIG. 2, control pins 80 project from the annular flange 64 of the upper battery portion 30 into associated grooves 82 which are angled in a zig-zag shape and which are provided in an outer peripheral surface 84 of the inertia body 26. With regard to the configuration of the grooves 82 which are angled in a zig-zag shape, reference is also directed to German Patent DE 100 38 066 B4, corresponding to U.S. Patent Application Publication No. US 2002/0034681 and U.S. Pat. No. 6,673,486, referred to in the introductory portion of this specification.

The inertia body 26 is in the form of an inertia ring 86, which is displaceable under the effect of an impulse in the annular space 62 of the upper battery portion 30, against the spring force of the compression spring 28.

The outer peripheral surface 84 of the inertia body 26 has a number, corresponding to the number of control pins 80, of the grooves 82 which are angled in a zig-zag shape and which, like the control pins 80, are spaced uniformly in the peripheral direction.

The inertia ring 86 has a peripherally extending groove 90 at its end 88 towards the cover element 38. The compression spring 28 is in the form of a compression coil spring and projects with one end portion 92 into the peripherally extending groove 90 in the inertia ring 86. An oppositely disposed, other end portion 94, of the compression coil spring 28 bears against the annular connecting portion 66 of the upper battery portion 30.

Disposed in the lower battery portion 32 are battery cells 96, which are spaced from the ampoule 12 by the electrolyte-permeable ampoule receiving portion 40.

The mode of operation of the activatable battery 10 is as follows:

Due to firing or launch acceleration, the inertia body 26 is moved in the direction of the cover element 38 against the compression spring 28. Due to the engagement of the control pins 80 into the grooves 82 which are provided in an angled configuration in a zig-zag shape in the outer peripheral surface 84 of the inertia body 26, the movement of the inertia body 26 takes place not only in the axial direction in a straight line, but at the same time as the axial movement, the inertia body 26 must first rotate in one direction and thereafter in the opposite other direction in order to follow the path of movement of the inertia body 26. That rotary movement and reversal is a timing member, as a consequence of the moment of inertia of the inertia body 26.

The firing or launch acceleration must be operative at a given level of magnitude over a given period of time, so that the inertia body 26 reaches its limit position. When the inertia body 26 has reached the limit position, the ampoule striker 46 is released by way of the locking balls 72. Due to the firing or launch acceleration which is still operative and/or due to the relief of the mechanically stressed striker spring 48, the ampoule striker 46 is accelerated against the ampoule 12 which is fixedly installed in the lower battery portion 32 and which ruptures upon impact of the ampoule striker 46 against the projection 18 thereof and liberates the electrolyte 20 in the ampoule 12. The ampoule striker 46 acts as a plunger. In a short time it presses the electrolyte 20 into the battery cells 96. The electrolyte 20 therefore penetrates into the battery cells 96 so that the battery 10 very rapidly generates its electrical voltage.

In the event of an unintentional shock loading on the battery, that is to say in the event of a shock in the critical direction of the battery 10, the above-described sequence of movements takes place. Since, under some circumstances, shocks can indeed be of a substantially greater amplitude but are of a substantially shorter term, movement of the inertia body 26 occurs at a maximum only up to shortly before the change in direction of the control pins 80 in the grooves 82 which are angled in the zig-zag shape. The inertia body 26, however, is stopped shortly before that change in direction and moves back into the initial position. The system therefore remains safe. What is important in this respect is that the acceleration of the inertia body 26 caused by an unintentional shock must have expired or died away, in terms of time, before the inertia body 26 reaches the locations involving the change in direction of the grooves 82 that are angled in the zig-zag shape. That can be implemented without any problem, that is to say adjusted, by suitable dimensioning of the mass of the inertia body 26 and the compression spring 28.

Since the ampoule 12 is immovably embedded in the lower battery portion 32, it is afforded optimum protection in relation to any possible unintentional loading.

The invention claimed is:

1. An activatable battery for an electronic artillery fuse and mortar fuse, the activatable battery comprising: an upper battery portion and a lower battery portion; an ampoule to be filled with an electrolyte, said ampoule being disposed immovably in said lower battery portion; an activation device disposed in said upper battery portion for rupturing said ampoule; a timing member for freeing said activation device for evaluation of a duration of a mechanical impulse acting on the battery, said timing member having an axially and rotatably displaceable inertia body; and a compression spring operative against displacement of said inertia body; said activation device including an ampoule striker and a striker spring; and wherein when said timing member releases said ampoule striker, said ampoule striker moves and ruptures said ampoule;

wherein said ampoule striker and said striker spring are located in said upper battery portion.

2. The battery according to claim 1, wherein said upper battery portion and said lower battery portion axially adjoin each other.

3. The battery according to claim 1, which further comprises:
a cup-shaped housing in which said upper battery portion and said lower battery portion are disposed; and
a cover element closing a cup opening in said cup-shaped housing.

4. The battery according to claim 3, wherein:
said lower battery portion has an electrolyte-permeable ampoule receiving portion; and
said ampoule has a bottom bearing against said cover element of said housing and a side wall fixed to said ampoule receiving portion.

5. The battery according to claim 4, wherein:
said ampoule has a projection opposite said bottom, said projection protruding into said upper battery portion.

6. The battery according to claim 5, wherein:
said upper battery portion has a central space for said ampoule striker and for said striker spring, and said upper battery portion has an annular space;
a sleeve wall is disposed between said annular space and said central space;
an annular flange outwardly delimits said annular space; and
an annular connecting portion is connected between said annular flange and said sleeve wall.

7. The battery according to claim 6, wherein:
said sleeve wall of said upper battery portion has at least one through hole;
a locking ball is disposed in said at least one through hole;
said ampoule striker has an outer peripheral surface adjacent said sleeve wall with a recess for said at least one locking ball; and
said inertia body is an inertia ring being axially displaceable due to an impulse in said annular space of said upper battery portion against a spring force of said compression spring.

8. The battery according to claim 7, wherein:
said at least one through hole in said sleeve wall of said upper battery portion is a number of through holes distributed uniformly in peripheral direction of said sleeve wall;
said locking ball is one of a number of locking balls each disposed in a respective one of said through holes; and
said recess in said ampoule striker is a groove extended around said outer peripheral surface of said ampoule striker.

9. The battery according to claim 7, wherein:
said inertia ring has an end facing towards said cover element with a peripherally extending groove; and
said compression spring is a compression coil spring having one end portion projecting into said peripherally extending groove in said inertia ring and an opposite other end portion bearing against said annular connecting portion of said upper battery portion.

10. The battery according to claim 6, wherein:
said inertia body has an outer peripheral surface; and
at least one control pin projects from said annular flange of said upper battery portion into an associated groove angled in a zig-zag shape in said outer peripheral surface of said inertia body.

11. The battery according to claim 10, wherein:
said at least one control pin is a number of control pins projecting away from said annular flange of said upper battery portion in uniformly spaced relationship in peripheral direction; and
said groove is one of a number of grooves in said outer peripheral surface of said inertia body, corresponding to said number of control pins, said grooves being angled in a zig-zag shape and spaced uniformly from each other.

12. The battery according to claim 5, wherein said ampoule striker has an end remote from said cover element and a central blind hole in said end, and said striker spring is disposed in said central blind hole.

13. The battery according to claim 12, wherein said ampoule striker is a plunger guided both in said upper battery portion and in said lower battery portion.

14. The battery according to claim 5, wherein said striker spring is a compression coil spring.

15. The battery according to claim 5, wherein said ampoule striker has an end facing towards said cover element and a central recess in said end, and said ampoule projection projects into said central recess with spacing all around.

16. The battery according to claim 1, wherein said striker spring is mechanically stressed to move said ampoule striker when said timing member releases said ampoule striker such that said ampoule striker ruptures said ampoule.

* * * * *